United States Patent [19]

Priere et al.

[11] Patent Number: 5,223,769

[45] Date of Patent: * Jun. 29, 1993

[54] SCAN VELOCITY MODULATION APPARATUS

[75] Inventors: Bernard Priere, Genlis; Jean-Pierre Fourche, Dijon; Alain Dossot, Chevigry St. Sauveur, all of France

[73] Assignee: Videocolor S.A., Paris, France

[*] Notice: The portion of the term of this patent subsequent to Nov. 24, 2009 has been disclaimed.

[21] Appl. No.: 786,623

[22] Filed: Nov. 1, 1991

[30] Foreign Application Priority Data

Nov. 9, 1990 [EP] European Pat. Off. ........ 90403183.8

[51] Int. Cl.$^5$ ............................................. H01J 29/56
[52] U.S. Cl. .................................... 315/370; 335/213
[58] Field of Search .................. 315/370; 335/212, 213

[56] References Cited

U.S. PATENT DOCUMENTS

| | | |
|---|---|---|
| 4,455,542 | 6/1984 | Sluijterman et al. ................ 335/213 |
| 4,524,340 | 6/1985 | Sluyterman ......................... 335/212 |
| 5,166,576 | 11/1992 | Roussel et al. ...................... 313/431 |

OTHER PUBLICATIONS

U.S. Patent Application Ser. No. 700,719, filed May 17, 1991, Deflection Yoke Arrangement With Overlapping Deflection Coils, Roussel et al.

Primary Examiner—Theodore M. Blum
Attorney, Agent, or Firm—Joseph S. Tripoli; Joseph J. Laks; Francis A. Davenport

[57] ABSTRACT

A scan velocity modulation (SVM) coil arrangement for a cathode ray tube has SVM coils arranged on a rear portion of the main horizontal deflection coils. The main horizontal coils are of the saddle type and have flat end turns at the rear of the deflection coil, lying along the surface of the picture tube. The SVM coil is placed over the flat rear end turns forward of the static convergence magnets and forward of ferromagnetic materials associated with the electron gun. The sensitivity of the SVM coil is increased to the point that the coil can be efficiently driven in a progressively scanned raster display, at twice the horizontal rate of an interleaved raster display.

15 Claims, 5 Drawing Sheets

SCAN VELOCITY MODULATION APPARATUS

This invention relates to the field of beam scan velocity modulation apparatus for cathode ray tube displays.

Scan velocity modulation is known in beam deflection of cathode ray tubes, and is employed in order to obtain improved contrast and sharpness of the picture. The basic idea is to change the horizontal scan velocity of the electron beam during a transition from light to dark or dark to light along the scanning pattern. Assuming, for example, that the scan is to pass across a bright vertical line on a dark background, the objective is to reproduce a display wherein the luminance of the screen for each horizontal scan crossing the line rises instantly from a minimum in the dark area to a maximum at the line, and drops instantly from the maximum to the minimum upon passing the line. However, the rise and fall times of the electron beam current and phosphor light output are not zero. The actual display (with scan velocity modulation not in use) has shades of gray at the transitions, which the viewer perceives as a lack of sharpness or a blurring at the transitions.

With beam scan velocity modulation, circuitry is provided to anticipate the transition in luminance, and to modify the horizontal scanning speed such that the beam is accelerated at the dark area adjacent the transition, i.e., scanned at a rate in excess of the average scan rate. The time gained by this acceleration of the beam is used on the bright side of the transition, where the beam is decelerated to below the average scanning rate, thereby exciting the phosphors of the bright side of the transition longer. This causes the transition to appear sharper than would occur if the beam is scanned across the transition at a rate which did not take the transition into account. The total time taken to scan horizontal lines remains constant, with the acceleration and deceleration canceling one another. At transitions from a light background to a dark area the process is reversed. The net effect is to null out beam spread and rise time, increasing the sharpness of image edges as perceived by the viewer.

The beam velocity modulation is applied using an additional deflection coil operable to modify the horizontal deflection of the beam. The additional deflection coil is excited by a driver circuit that amplifies the luminance video signal, differentiates the luminance and then discards all of the video signal except the level transitions. The SVM coil typically drives a flat wound laminated coil on or within the purity/static convergence magnet holder.

Deflection coils are typically mounted to a glass picture tube on a plastic deflection yoke form. A horizontal deflection field is produced by a saddle shaped coil arrangement placed on the neck of the tube, and a vertical deflection field is produced by a toroidal coil arrangement wound around a core placed around the tube neck. These coils are disposed on the funnel or flaring portion of the tube forward of the electron gun, which is at the extreme rear of the tube.

It is desirable to place the SVM coil as close as possible to the electron beam, so that the available power of the magnetic field generated for scan velocity modulation is applied to the electron beam without decrease in field strength due to spacing. Moreover, spacing is at a premium. A typical SVM coil is mounted in a manner that represents certain compromises. While the SVM coil may be placed close to the beam, it is also close to ferrous and/or conductive materials.

According to the prior art, the SVM coil is mounted on the rear of the deflection yoke form, in close proximity with the electron gun and overlapping portions of the electron gun along the longitudinal or Z-axis. The SVM coil is associated with the static convergence magnets, which are typically defined for a nonadjustable type by means of a tape of plastic binder with embedded ferrous powder (e.g., barium ferrite), placed to the rear of the deflection yoke at the electron gun, and magnetized during initial setup of the deflection yoke to cause the respective beams of the electron gun to converge at a point.

The mounting of the SVM coil to the rear of the deflection yoke also places the SVM coil in immediate proximity with the electron gun structure. The electron gun normally include permeable ferromagnetic material (e.g., steel) that to a certain extent may confine the lines of flux of the SVM field to the permeable material, preventing application to the beam path of the full field strength which the SVM coil otherwise could produce. Insofar as the electron gun includes non-ferromagnetic conductive material, eddy currents may be induced, tending to waste the power of the SVM field in resistive heating of the conductive materials. In short, the ferrous and conductive material of the electron guns tends to reduce the strength of the SVM field interacting with the electron beams.

Although it is possible to combat adverse effects inherent in a particular mounting location of an SVM coil by increasing the drive current, number of coil turns or the like until the resultant magnetic field applied to the beam is sufficient to obtain the required extent of deflection for scan velocity modulation, there are other problems associated with such changes. For example, increasing the number of turns of the SVM coil affects its inductance and operability at the required frequencies for the differentiated video signal. Increasing the current requires improved performance current drivers and/or a higher voltage power supply. These means for resolving needed improvements in SVM performance can be expensive.

The problems mentioned are more difficult in television apparatus using a progressively scanned raster rather than a raster of successive interleaved fields. A progressively scanned raster operates at double the usual horizontal scanning rate in order to scan all the lines of the video frame (e.g., 625 lines in PAL) during the time previously allowed for one of two interleaved fields. The frequencies employed in the video signal, which is differentiated to obtain the SVM drive signal, are twice as fast ($2f_H$) as the frequencies in the interleaved field arrangement ($f_H$). Nevertheless, the magnetic field required of the SVM coil to obtain a given amount of deflection must be about the same as before, because the extent of auxiliary deflection of the electrons in the beams is a function of field strength. As a result, the SVM driving circuitry must produce large amplitude current pulses, but due to the higher scanning rate, the current pulses are of shorter duration. This places severe demands on the SVM coil driving circuitry, and may lead to additional expense in the provision of higher powered and faster components.

It is an aspect of the invention to relieve demands on the SVM driving circuitry insofar as possible by maximizing the sensitivity of the SVM coil.

It is a further aspect of the invention to distance the SVM coil arrangement from ferrous and other metallic materials associated with the electron guns.

It is also an aspect of the invention to achieve an improved sensitivity SVM coil mounting in a manner that does not add to the dimensions of the picture tube along the electron beam axis or Z-axis and readily can be accomplished on a short neck tube.

In an inventive arrangement, a scan velocity modulation (SVM) coil arrangement wherein the SVM coils are arranged to overlap a rear portion of the main horizontal deflection coils along the Z-axis. The main horizontal coils may be of the saddle type and have straight end turns, i.e., flat windings at the rear of the deflection coil, lying along the surface of the picture tube. The SVM coil may be placed over the flat rear turns of the main horizontal deflection coil, to the rear of the core around which the vertical deflection coil is wrapped. The SVM coil is thus placed well clear of ferromagnetic and most conductive materials associated with the electron gun, and in relatively close proximity with the electron beam. The sensitivity of the SVM coil is improved to the point that the coil can be driven in a progressive raster display, at twice the horizontal rate (i.e., 2fH) for interleaved raster display, using substantially the same sort of driving circuitry formerly employed with SVM coils used in conjunction with interlaced scanning at fH.

Figure 1:
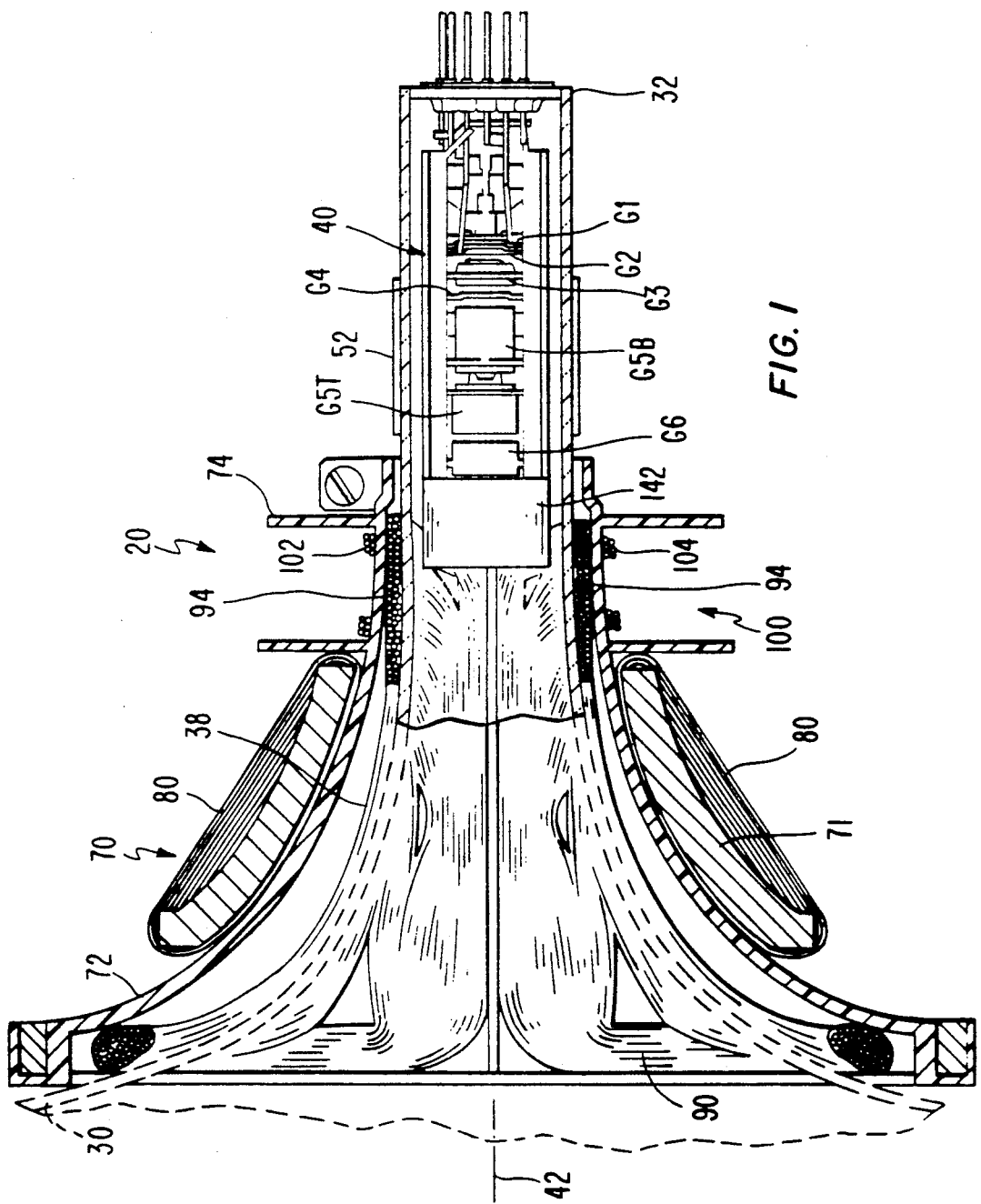
FIG. 1 is a partial side section view in elevation, showing a cathode ray tube, deflection yoke and SVM coil arrangement according to the invention, the tube shown partly cut away to reveal the electron gun structure.
Figure 2:
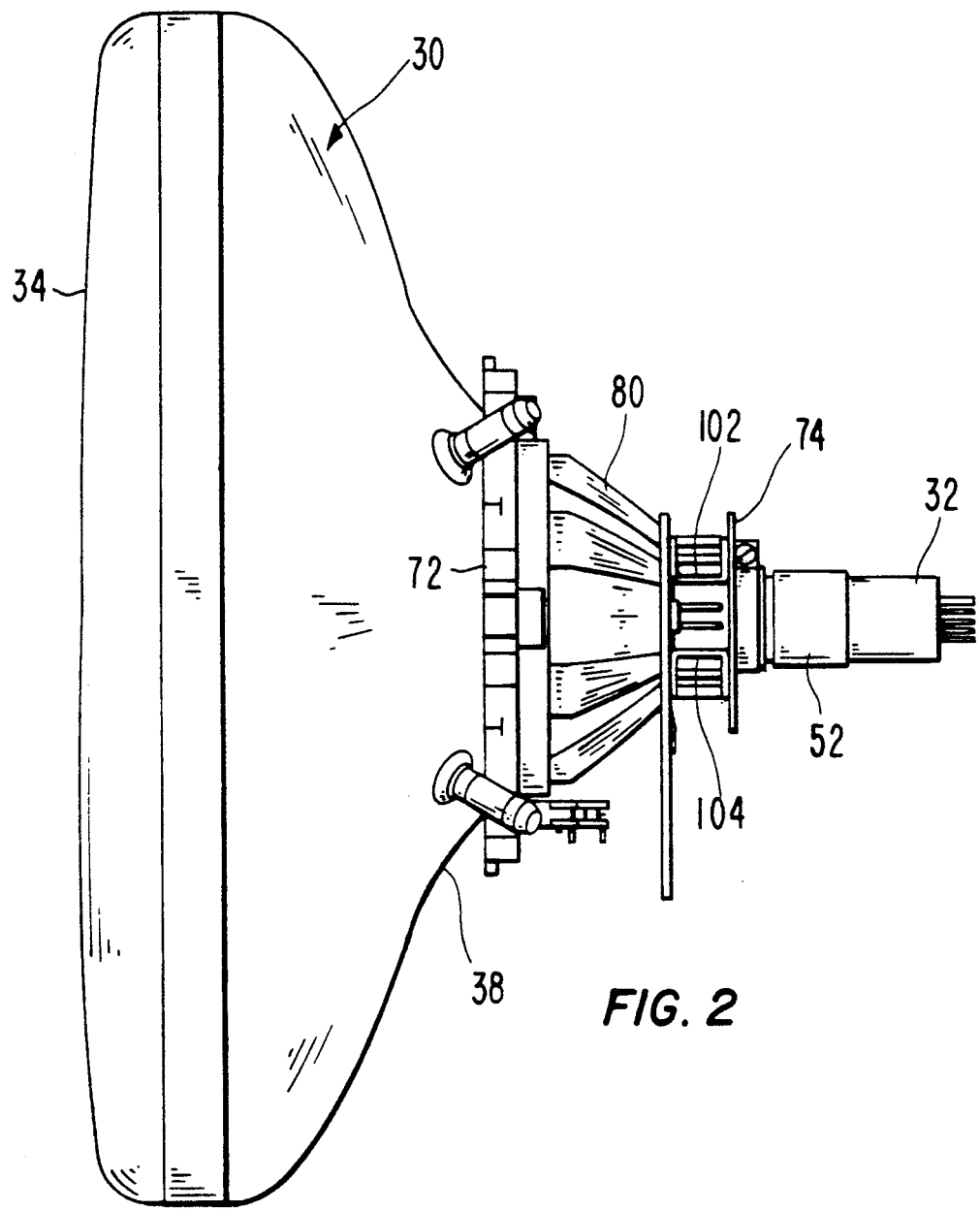
FIG. 2 is a side elevation thereof, showing the full television tube.

With reference to FIGS. 1 and 2, a television picture tube 30 is arranged with an electron gun 40 at a rear end 32, emitting a stream of electrons which are accelerated toward the phosphor screen 34 at the opposite or front end. The luminance (brightness) of light emission by the screen is determined in part by the current level of incident electrons emitted by the electron gun 40 and striking the phosphors at any particular point on the screen. The electrons are moving charges and constitute a current, whereby the electrons are deflected by incident magnetic fields. The electron beam is deflected at a horizontal scanning rate to trace successive lines, and at a vertical scanning rate to cause the successive lines to be vertically spaced from one another on the screen, the scanning defining a raster pattern which is repeated in interleaved fields or in progressive scans of each successive line in turn.

The television tube or cathode ray tube 30 has a funnel shaped or flaring portion 38 between the electron gun end 32 and the screen 34. Deflection coils for vertical deflection and horizontal deflection are mounted on a deflection yoke arrangement 70 on the funnel portion 38 of the tube, typically being wound on a plastic yoke form or liner 72. The vertical and horizontal deflection coils 80, 90 are elongated along the funnel in a longitudinal direction, parallel to the electron beam axis 42, and follow along the flaring surface 38 of the tube 30. The vertical deflection coils or windings are wrapped toroidally on a magnetically permeable core 71 and the horizontal deflection windings rest against the surface 38 of the tube. The vertical windings are disposed in the area of 6 and 12 o'clock as viewed along the beam axis and the horizontal windings are at 3 and 9 o'clock. The vertical deflection coils produce horizontal magnetic flux lines intersecting the beam path (causing vertical displacement) and the horizontal coils produce vertical flux (for horizontal displacement). The horizontal deflection coils operate at a higher frequency than the vertical coils to accomplish line scanning, and for saddle type coils are typically placed on the inside of the deflection yoke liner, adjacent the outer surface 38 of the tube 30, closer to the electron beams, as shown in FIG. 1. The vertical deflection coils are outside the liner on the core, as shown in FIGS. 1 and 2.

Figure 4:
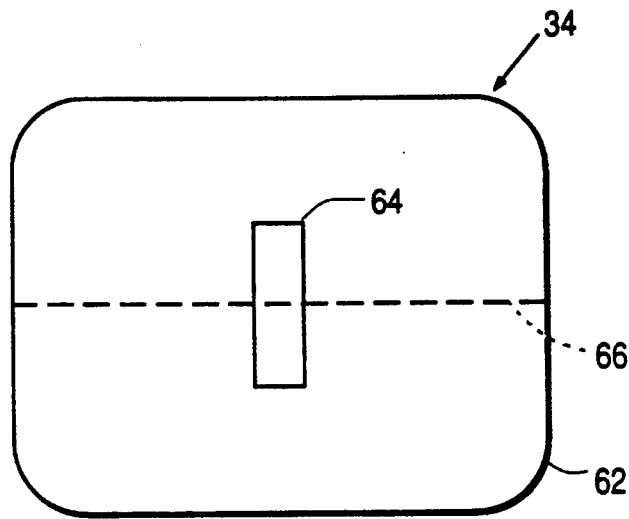
FIG. 4 is an elevation view of a television screen, having a contrasting bright bar disposed on a background.
Figure 5:
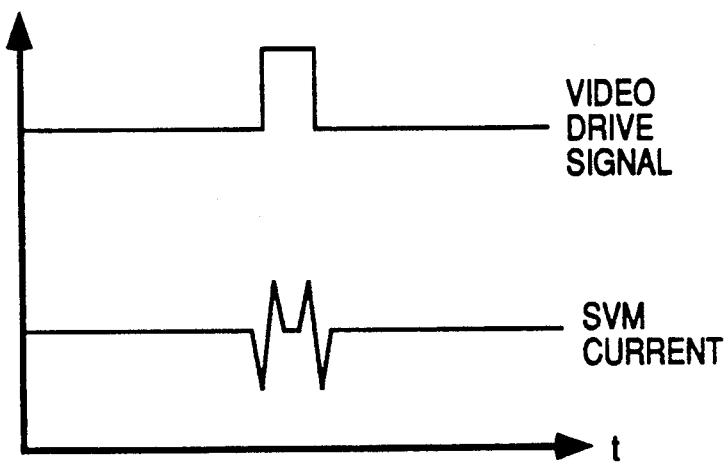
FIG. 5 is a time diagram showing the video drive signal and the SVM drive signal applied in the case of a display as shown in FIG. 4.

Assuming that an electron beam scanning across the screen encounters a change in luminance such as a vertical bright line as shown in FIG. 4 (i.e., when the current of the electron beam is increased or decreased to achieve brighter or darker emission from the phosphors on the screen), the rise and fall time of the electron beam current would normally occur while horizontal scanning proceeds. This produces, in combination with the effects of beam spot profile, an area of increasing brightness approaching a transition to the brighter shade, and an area of decreasing brightness proceeding away from the transition to the darker shade, in the direction of scanning. To combat the lack of resolution or clarity inherent in such a situation, the video drive signal (e.g., the stepwise variation in luminance as shown in FIG. 5) is processed by a beam scan modulation circuit to obtain a signal used to modify the horizontal deflection of the beam at the transitions. For example, when the beam during horizontal scan line 66 as shown in FIG. 4 passes from a darker background 62 to a brighter area 64, the circuit accelerates the beam approaching the transition and decelerates the beam after the transition. Conversely, when passing from the brighter area 64 to a darker area 62, the beam is decelerated approaching the transition and accelerated upon passing the transition. The net change of the accelerations and decelerations encountered along each scan line is zero, such that the scan rate for each full line is equal to the average scan rate. Circuits for producing the SVM current signal shown in FIG. 5 are known in the art. Such circuits anticipate a transition in luminance, and differentiate the luminance of the video signal. The differentiated signal is AC coupled to an auxiliary horizontal deflection coil provided in addition to the main horizontal deflection coil, to obtain the required scan rate modulation by adding the SVM deflection to the deflection produced by the main horizontal deflection coil.

Scan velocity modulation as known in the art may typically be executed by placing an auxiliary coil on the static convergence magnets disposed adjacent the electron gun of the tube. However, the electron gun includes ferromagnetic and conductive material. A portion of the magnetic flux produced by the SVM coil accordingly is applied in an area where the ferromagnetic material of the electron gun tends to confine the lines of flux to magnetically permeable materials. Part of the magnetic field produced by the SVM coil thus becomes confined to a path that does not intersect the electron beam. Furthermore, much of the structure of the gun is conductive metal. Magnetic field variations produced by the SVM coil therefore induce currents in the conductive elements of the gun. Although the SVM coil is placed close to the source of the electrons (i.e., close to the electron gun), part of its power is wasted on resistive heating via eddy currents in the conductive elements of the gun.

An electron gun arrangement is shown in side elevation in FIG. 1. In a color television apparatus, the electron gun has three spaced inline cathodes disposed at the rear end 32 of the tube 30, for red, blue and green colors, respectively, only one being shown in the drawing. The gun has; a control grid electrode G1; a screen grid electrode G2; a first prefocus lens electrode G3; a second prefocus lens electrode G4; a combined third prefocus lens electrode and first quadrupole (multipole) lens electrode G5B; a combined second quadrupole lens electrode and first main focusing lens electrode G5T; and, a second main focusing lens and an acceleration electrode G6, these items being placed in order proceeding from the rear 32 of the tube. The main focus lens point of the gun is in the gap between the G5T and G6 electrodes. At the front of the electron gun, a shield cup 142 is disposed forwardly of the final electrode or anode G6. Shield cup 142 is provided at the front or exit end of the gun 40 and is open on its front. At various ones of the three apertures, by which the electron beams exit electrode G6 into shield cup 142, shunts and enhancers are provided to shield the emerging beams from stray vertical fields, and correct for a convergence error known as coma error.

The gun electrodes are conductive and certain ones of the electrodes may also be ferromagnetic. Electrode G3 is made, for example, of iron nickel 48, and shields the beams from stray vertical fields to prevent spot coma, i.e., to prevent flaring of the electron beam cross sections. The shield cup 142 as noted is provided with ferromagnetic shunts and enhancers for shielding the emerging beams from vertical fields. The grid electrode G1, which must withstand temperature cycling due to its proximity to the heated cathodes, is made for example of stainless steel 430, for low thermal expansion characteristics. This material is also magnetically permeable.

Static convergence magnets 52 are disposed on the tube in immediate proximity to the electron gun as shown in FIG. 1. The convergence magnets are permanent magnets (i.e., producing static magnetic fields) and are used to adjust the convergence of the three electron beams when initially setting up the television tube. In known arrangements, SVM coils are disposed directly on the static convergence magnets, the magnets being formed by ferromagnetic powder embedded in a plastic, for example a plastic tape attached rearward of the deflection yoke liner.

Figure 3:
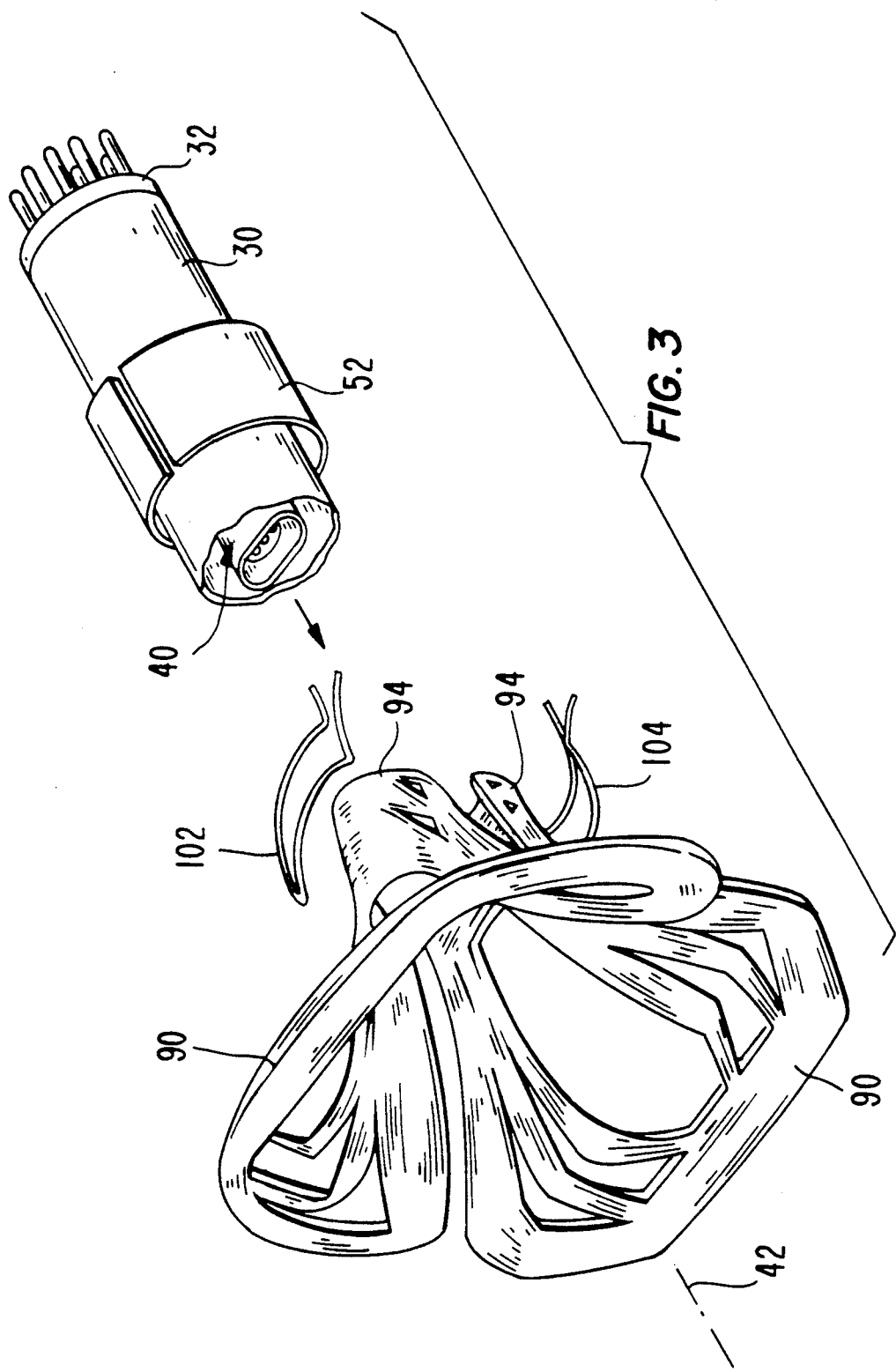
FIG. 3 is a vertically exploded perspective view showing the relationship of the electron gun, static convergence magnets, horizontal deflection coils and SVM coil.

The present inventive arrangement may also use static convergence magnets, for example in the form of a plastic tape 52 with embedded barium ferrite powder, as shown in FIGS. 1-3. However, the SVM coil, coil 100, is located at a distance from the convergence magnets 52, i.e., forward along the beam axis 42, and also substantially forward relative to most of the metallic structure of electron gun 40. According to an inventive feature, the SVM coil is arranged to at least partly overlap the flat rear end turn windings 94 of the main horizontal deflection coils along the Z-axis. According to a different inventive feature, the SVM coil is arranged longitudinally forward of the gun main focus lens point and rearward of core 71.

In such an arrangement, the magnetic field produced by the SVM coil does not significantly interact with ferromagnetic and most of the conductive elements in the electron gun. More of the current used to excite the SVM coil is used to produce a magnetic flux which intersects the electron beam path. As a result the SVM coil is more sensitive than in an arrangement wherein the SVM coil is placed on the convergence magnets or otherwise over several of the electrodes of the gun 40. More of the available output of the SVM driving circuit is put to advantage toward the objective of varying the horizontal beam scanning velocity, to correct for the rise and fall time of the electron beam and to sharpen the contrast of the display at the edges of transitions in luminance.

The SVM coil 100 is placed substantially clear of the electrodes of the electron gun 40. The SVM coil 100 has an upper coil winding 102 and a lower coil winding 104, arranged to overlap (along the Z-axis) the rear turns of the main horizontal deflection coils at the rear of the deflection yoke. These turns of the main horizontal deflection windings advantageously are laid flat on the surface 38 of the tube, with the SVM coil superimposed or placed thereon. The SVM coils thus need be spaced from the tube 30 (and from the electron beam) by only the thickness of the flat rear windings of the horizontal coil. In this manner the SVM coil produces substantially improved beam deflection distance per unit of driving current).

As shown in FIGS. 1 and 2, the SVM coil 100 is mounted on a bobbin 74 at the rear of the deflection yoke liner 72. The upper SVM coil section 102 and lower SVM coil section 104 are connected in parallel and when energized with a current produce a generally dipole vertically oriented magnetic field operable to deflect the electron beam horizontally, effectively modifying the horizontal scan rate of the beam as obtained using the main horizontal deflection coil 90.

The main horizontal deflection coil 90, the SVM coil windings 102 and 104, and the electron gun 40 with static convergence magnet tape 52 thereon, are shown in FIG. 3 with the respective parts disposed in their relative positions along the Z-axis 42, but in an exploded view radially of the beam axis. The windings of the horizontal coil 90 run along the inner surface of the deflection yoke liner 72 (not shown in FIG. 3), defining loops winding along the funnel shaped portion of the deflection yoke liner and extending in a flat configuration at the rear windings 94 of the deflection coil. Successive rear end turn conductors in the coil pass alongside one another on the surface of the coil as rested on the surface of the tube when the deflection yoke is in place.

The SVM coils overlap the flat rear windings of the horizontal deflection coil along the Z-axis at the rear of the deflection yoke. As seen in FIG. 1, the SVM coils can overlap the extreme front of the electron gun structure in the area of the shield cup 142. However, the SVM coils do not overlap the main body of the gun, and also advantageously do not overlap the rear end of core 71 or the rear of the vertical deflection coil.

The SVM sensitivity is substantially improved as compared to known SVM coil arrangements. This enables the SVM coil apparatus to operate at relatively lower current levels, and eases the demands on the driving circuitry therefor, particularly at $2f_H$ scan rates as used for progressive raster scanning.

Figure 6:
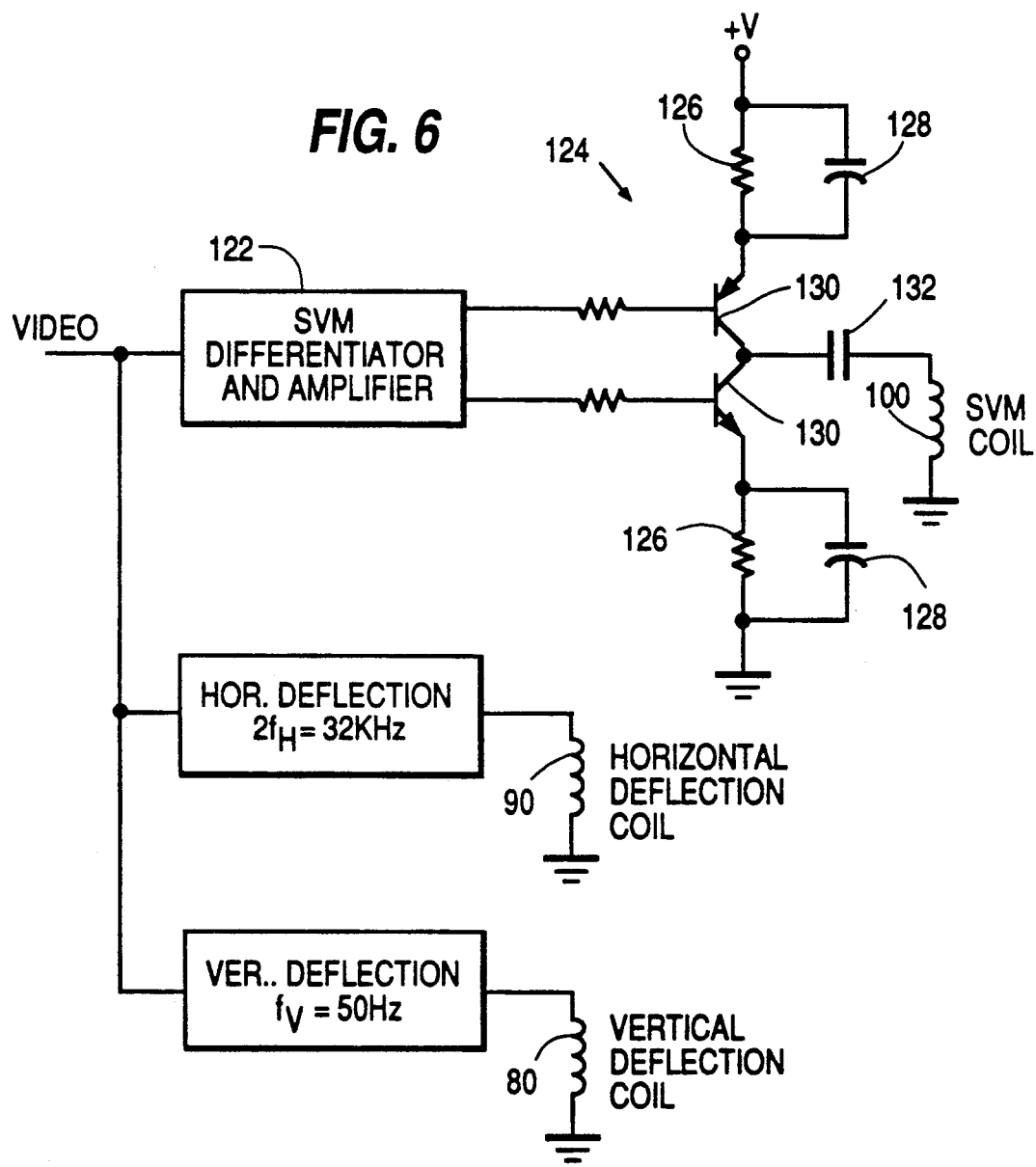
FIG. 6 is a schematic circuit diagram showing the beam deflection arrangement driving the SVM coil of the invention.

Due to the increased sensitivity of the SVM coil according to the invention, the SVM coil even at a $2f_H$ scanning rate can be excited by circuitry having reduced drive or component construction requirements. As shown in FIG. 6, the video signal (in particular the luminance level) is coupled to SVM differentiator and preamplifier 122, which develops the scan modulation signal. The video signal is also coupled to the vertical and horizontal deflection coils 80, 90, to synchronize appropriate vertical and horizontal deflection circuits. Differentiator and preamplifier 122 provides a push-pull output to driver stage 124 of the SVM circuit, which includes a pair of transistors 130, connected to conduct at opposite polarity and biased by series/parallel resistors 126 and capacitors 128. The output of driver 124, coupled between transistors 130, is AC coupled to the SVM coil 100 via capacitor 132.

In an advantageous arrangement, the upper and lower windings 102, 104 of SVM coil 100 are rectangular windings of about six turns, and are simply taped (non-ferromagnetically) to the outer surface of the bobbin 74 at the rear of the deflection yoke liner 72. The bobbin may have an outer diameter, for example of about 4.0 cm, and the upper and lower SVM coil windings can be about 42 mm×25 mm, each wrapped circumferentially part way around the bobbin. Advantageously, the SVM coil windings each occupy more than 90°, and in the illustrated example occupy about 120°, around the circumference of the bobbin, and therefore the tube. The two coil windings in parallel define a resistance of about 0.15 ohm and an inductance of 1.8 microHenries. The coils produce a dynamic sensitivity at the center of the screen of about 1.7 mm deflection per ampere of coil excitation current. It has been determined that good effects in sharpness of transitions in luminance is achieved when the coil is driven to provide a maximum deflection of about 2.2 mm, i.e., at a maximum driving current of about 1.3 amps.

The invention is particularly applicable to a 34 V 16×9 aspect ratio picture tube, and the SVM coil is quite compact along the Z-axis. The SVM coil is disposed on bobbin 74 near the extreme rear of the horizontal deflection yoke. The rear of the yoke is substantially adjacent the static convergence magnet 52. The deflection yoke protrudes rearwardly by a short distance to engage under a clamp for affixing the liner to the tube. To the rear of the liner only about 3 mm distance remains to the edge of the static convergence magnet tape 52, which is about 2.5 cm in width. SVM sensitivity is improved while still maintaining a compact arrangement.

What is claimed is:

1. A scan velocity modulation apparatus for a cathode ray tube, the cathode ray tube including an electron gun adjacent a rear end of the tube, for emitting an electron beam along a beam path from the electron gun through a funnel of the tube to a screen at a front of the tube, the apparatus comprising:

a static convergence magnet assembly disposed over the electron beam path;

a primary deflection yoke including a vertical deflection winding for vertical deflection of the beam and a horizontal deflection coil for horizontal deflection of the beam, the horizontal deflection coil having end turns at a rear end, disposed substantially adjacent to the static convergence magnet; and a scan velocity modulation coil for modifying said horizontal deflection of the electron beam, the scan velocity modulation coil located along the longitudinal axis of the tube adjacent the horizontal deflection coil, with one of the two coils at least partly overlapping the other coil.

2. The apparatus according to claim 1, wherein rear end turns of the horizontal deflection coil include flat windings positioned along a surface of the tube and extending for a distance along the longitudinal axis.

3. The apparatus according to claim 2, wherein the scan velocity modulation coil is at least partly superimposed on the rear end turns of the horizontal deflection coil.

4. The apparatus according to claim 2, wherein the rear end turns are arranged between the scan velocity modulation coil and a surface of the tube.

5. The apparatus according to claim 1, wherein the scan velocity modulation coil is disposed without overlap forward of the static convergence magnetic assembly.

6. The apparatus according to claim 5, wherein the vertical deflection winding is wound on a core on the funnel, and the scan velocity modulation coil is disposed without overlap to the rear of the core.

7. The apparatus according to claim 6, wherein the upper and lower coil sections of the scan velocity modulation coil each extend substantially more than 90° around a circumference of the tube.

8. The apparatus according to claim 1, wherein upper and lower coil sections of the scan velocity modulation coil are arranged on a bobbin formed on a rear of a deflection yoke liner, arranged forward of the electrode structure in the electron gun that includes a prefocusing electrode.

9. The apparatus according to claim 8, wherein the coil sections are arranged forward of the final anode electrode.

10. The television apparatus according to claim 1, wherein the horizontal deflection coil is excited at a scanning rate suitable for progressive scanning of a raster.

11. The television apparatus according to claim 1, wherein the horizontal deflection coil protrudes rearwardly along the longitudinal tube axis of the electron beam, away from the vertical deflection winding, said scan velocity modulation coil being disposed rearwardly of the vertical deflection winding and forwardly of most of the metallic structure in the electron gun.

12. The television apparatus according to claim 11, wherein the scan velocity modulation coil has a sensitivity of at least 1.7 millimeter deflection per ampere of modulation coil current at the center of the screen.

13. The apparatus according to claim 1, including means for exciting the scan velocity modulation coil for varying a horizontal scan rate of said electron beam.

14. The apparatus according to claim 1, wherein the scan velocity modulation coil includes an upper coil section and a lower coil section connected in parallel, said upper coil section and said lower coil section being operable to produce a generally dipole magnetic field oriented vertically, perpendicular to the longitudinal axis.

15. A scan velocity modulation apparatus for a cathode ray tube, the cathode ray tube including an electron gun adjacent a rear end of the tube, for emitting an electron beam along a beam path from the electron gun through a funnel of the tube to a screen at a front of the tube, the apparatus comprising:

a static convergence magnet assembly disposed over the electron gun;

a primary deflection yoke including a core a vertical deflection coil for vertical deflection of the beam and a horizontal deflection coil for horizontal deflection of the beam, the horizontal deflection coil having end turns at a rear end, disposed substantially adjacent to the static convergence magnet;

a scan velocity modulation coil for modifying said horizontal deflection of the electron beam, the scan velocity modulation coil located along the longitudinal axis of the tube forward and without overlap of the static convergence magnet assembly and rearward and without overlap of the core; and means for exciting the scan velocity modulation coil for varying a horizontal scan rate of said electron beam.

* * * * *